United States Patent
Yao et al.

(10) Patent No.: US 9,725,584 B2
(45) Date of Patent: Aug. 8, 2017

(54) RESIN COMPOSITION AND RESIN MOLDED ARTICLE

(71) Applicant: FUJI XEROX CO., LTD., Tokyo (JP)

(72) Inventors: Kenji Yao, Kanagawa (JP); Hisae Yoshizawa, Kanagawa (JP); Minquan Tian, Kanagawa (JP); Masahiro Moriyama, Kanagawa (JP); Ryo Tanaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 27 days.

(21) Appl. No.: 14/830,232

(22) Filed: Aug. 19, 2015

(65) Prior Publication Data

US 2016/0280893 A1    Sep. 29, 2016

(30) Foreign Application Priority Data

Mar. 26, 2015    (JP) ................. 2015-064764

(51) Int. Cl.
| | |
|---|---|
| *C08L 1/12* | (2006.01) |
| *C08B 3/06* | (2006.01) |
| *C08B 3/16* | (2006.01) |
| *C08L 1/14* | (2006.01) |
| *C08B 3/18* | (2006.01) |

(52) U.S. Cl.
CPC .................. *C08L 1/12* (2013.01); *C08B 3/06* (2013.01); *C08B 3/16* (2013.01); *C08B 3/18* (2013.01); *C08L 1/14* (2013.01)

(58) Field of Classification Search
CPC ........................................................ C08L 1/12
See application file for complete search history.

(56) References Cited

U.S. PATENT DOCUMENTS

| | | | |
|---|---|---|---|
| 8,101,108 B2 * | 1/2012 | Otoshi | ................ B29C 47/0004 264/1.34 |
| 2008/0194807 A1 * | 8/2008 | Buchanan | ............ C07D 233/54 536/63 |
| 2009/0155495 A1 * | 6/2009 | Suzuki | ................ B29C 47/0021 428/1.31 |
| 2011/0098463 A1 * | 4/2011 | Yoshitani | ................ C08B 13/00 536/32 |
| 2012/0165517 A1 | 6/2012 | Uehira et al. | |

FOREIGN PATENT DOCUMENTS

| | | | | |
|---|---|---|---|---|
| JP | 2007-051304 A | | 3/2007 | |
| JP | 2011057959 A | | 3/2011 | |
| JP | 2014-012852 A | | 1/2014 | |
| JP | 2014012852 A | * | 1/2014 | ........... C07D 233/54 |
| JP | 2014084343 A | | 5/2014 | |

OTHER PUBLICATIONS

Oct. 4, 2016 Office Action issued in Japanese Patent Application No. 2015-064764.
Jan. 10, 2017 Office Action issued in Japanese Patent Application No. 2015-064764.

* cited by examiner

*Primary Examiner* — Melvin C Mayes
*Assistant Examiner* — Stefanie Cohen
(74) *Attorney, Agent, or Firm* — Oliff PLC

(57) ABSTRACT

A resin composition includes a cellulose derivative of which a weight average molecular weight is 10,000 or greater and less than 75,000 and in which at least one hydroxyl group is substituted with an acyl group having 1 to 6 carbon atoms.

7 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2015-064764 filed Mar. 26, 2015.

BACKGROUND

1. Technical Field

The present invention relates to a resin composition and a resin molded article.

2. Related Art

In the related art, various resin compositions are provided to be used for various applications. Particularly, thermoplastic resins are used in various components and housings of home appliances or automobiles, or in components such as housings of business machines and electric and electronic apparatuses.

Recently, resins derived from plants are used, and a cellulose derivative is one of the resins derived from plants which are well-known so far.

SUMMARY

According to an aspect of the invention, there is provided a resin composition including:

a cellulose derivative of which a weight average molecular weight is 10,000 or greater and less than 75,000, and in which at least one hydroxyl group is substituted with an acyl group having 1 to 6 carbon atoms.

DETAILED DESCRIPTION

Hereinafter, an exemplary embodiment which is an example of the resin composition and the resin molded article according to the invention is described.

Resin Composition

The resin composition according to the exemplary embodiment contains a cellulose derivative (hereinafter, referred to as "specific cellulose derivative") of which the weight average molecular weight is in the range of 10,000 or greater and less than 75,000, and in which at least one hydroxyl group is substituted with an acyl group having 1 to 6 carbon atoms.

In general, due to characteristics of the chemical structure of the cellulose derivative and characteristics in which the intramolecular and intermolecular hydrogen bonding strength is strong, the cellulose derivative may provide a resin molded article having an excellent elastic modulus and excellent heat resistance, but thermal fluidity (melt viscosity lowering properties when heat is applied) is low, and enhancement of moldability when the cellulose derivative is heat-melted and molded is desirable.

Here, as a method of enhancing moldability of the cellulose derivative, a method of increasing thermal fluidity by decreasing a melting temperature may be considered. However, as plasticity is increased, an elastic modulus is decreased, and heat resistance is also decreased. That is, the thermal fluidity and the elastic modulus in the cellulose derivative are inconsistent with each other, and thus the enhancement of the both is not easily obtained.

Meanwhile, since the resin composition according to the exemplary embodiment contains the specific cellulose derivative in which at least one hydroxyl group is substituted with an acyl group having 1 to 6 carbon atoms and of which a weight average molecular weight is 10,000 or greater and less than 75,000, a resin molded article having a high elastic modulus may be obtained and thermal fluidity is excellent.

The reason of the effect is not clear, but it is assumed as follows.

Generally, the strength of a resin tends to be low as the molecular weight of the resin becomes lower. With respect to the cellulose derivative, as the molecular weight becomes small, the number of terminals of the molecular chain is relatively increased, and thus the number of hydroxyl groups existing in the terminals is increased. Therefore, after molding is performed, hydrogen bonds are formed between hydroxyl groups at the terminals, hydrogen bonding strength becomes high, and thus an elastic modulus is enhanced. In addition, it is considered that, according to the influence of the hydrogen bonding strength, excellent heat resistance is also obtained.

In addition, when thermofusion is performed, the hydrogen bond between the terminals becomes weak. Therefore, when the molecular weight of the cellulose derivative is in the range described above, the viscosity is decreased, the thermal fluidity is increased, and thus the moldability is enhanced.

That is, when the weight average molecular weight of the cellulose derivative is in the range described above, compared with the case in which the weight average molecular weight is greater than the range described above, the resin composition according to the exemplary embodiment may realize excellent thermal fluidity of the resin composition and a high elastic modulus of a resin molded article obtainable therefrom, and further provide excellent heat resistance of the resin molded article.

In addition, in the resin molded article according to the exemplary embodiment, molding precision, that is, a degree in which dimensions required in a shape after molding are satisfied is excellent, an elastic modulus is high, and in addition, heat resistance is excellent.

Hereinafter, components of the resin composition according to the exemplary embodiment are described in detail.

Cellulose Derivatives

Weight Average Molecular Weight

With respect to the specific cellulose derivative used in the exemplary embodiment, the weight average molecular weight is 10,000 or greater and less than 75,000. The weight average molecular weight is more preferably in the range of 20,000 to 50,000.

If the weight average molecular weight is 75,000 or greater, the effect of increasing the elastic modulus by the hydrogen bond is decreased, and thus the effect of increasing heat resistance is also decreased. Also, the thermal fluidity is deteriorated. Meanwhile, if the weight average molecular weight is less than 10,000, the molecular weight becomes too small, the elastic modulus is decreased, and thus heat resistance is also decreased.

Here, the weight average molecular weight (Mw) is a value measured by gel permeation chromatography (GPC). Specifically, the molecular weight by GPC is measured with a GPC apparatus (manufactured by Tosoh corporation, HLC-8320GPC, Column: TSKgel α-M) by using a solution of dimethylacetamide/lithium chloride having a volume ratio of 90/10.

Structures

Specifically, as the specific cellulose derivative, for example, a cellulose derivative represented by the formula (1) is exemplified.

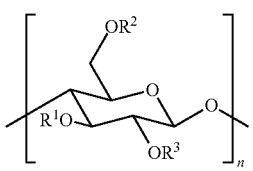

(1)

In the formula (1), $R^1$, $R^2$, and $R^3$ each independently represent a hydrogen atom and an acyl group having 1 to 6 carbon atoms. n represents an integer of 2 or greater. However, at least one of plural $R^1$s, plural $R^2$s and plural $R^3$s represents an acyl group having 1 to 6 carbon atoms.

In the formula (1), the scope of n is not particularly limited, but preferably in the range of 40 to 300, and more preferably in the range of 100 to 200.

If n is 40 or greater, the strength of the resin molded article is easily increased. If n is 300 or lower, the decrease of flexibility of the resin molded article is easily prevented.

Acyl Group

In the specific cellulose derivative used in the exemplary embodiment, at least one hydroxyl group is substituted with an acyl group having 1 to 6 carbon atoms. That is, if the cellulose derivative has a structure represented by the formula (1), at least one of plural $R^1$s, plural $R^2$s and plural $R^3$s represents an acyl group having 1 to 6 carbon atoms.

Therefore, plural $R^1$s in the cellulose derivative represented by the formula (1) may be identical to each other, or may be different from each other. In the same manner, plural $R^2$s and plural $R^3$s may be identical to each other, or may be different from each other, respectively. At least one of them represents an acyl group having 1 to 6 carbon atoms.

If all acyl groups substituted with the cellulose derivative only have 7 or more carbon atoms, an elastic modulus is decreased and the heat resistance is also decreased.

The number of carbon atoms of the acyl group substituted with the specific cellulose derivative is preferably in the range of 1 to 4, and more preferably in the range of 1 to 3.

The acyl group having 1 to 6 carbon atoms is represented by a structure of "—CO—$R_{AC}$", and "$R_{AC}$" represents a hydrogen atom or a hydrocarbon group having 1 to 5 carbon atoms.

The hydrocarbon group represented by "$R_{AC}$" may have any one of a linear shape, a branched shape, or a cyclic shape, but preferably a linear shape.

In addition, the hydrocarbon group may be a saturated hydrocarbon group or an unsaturated hydrocarbon group, but preferably a saturated hydrocarbon group.

In addition, the hydrocarbon group may contain other atoms than carbon or hydrogen (for example, oxygen or nitrogen), but preferably a hydrocarbon group made of only carbon and hydrogen.

As the acyl group having 1 to 6 carbon atoms, a formyl group, an acetyl group, a propionyl group, a butyryl group (butanoyl group), a propenoyl group, a hexanoyl group, and the like are exemplified.

Among these acyl groups, an acetyl group is preferable in view of the enhancement of the elastic modulus and the heat resistance and the enhancement of the moldability of the resin composition.

Substitution Degree

A substitution degree of the specific cellulose derivative is preferably in the range of 1.8 to 2.5. The substitution degree is more preferably in the range of 2.0 to 2.5, and still more preferably in the range of 2.2 to 2.5.

When the substitution degree is 2.5 or lower, the interaction between substituents does not become too strong, and the decrease of mobility of molecules is prevented, such that hydrogen bonds between molecules easily occur and an elastic modulus and heat resistance are further increased. In addition, when the substitution degree is 1.8 or greater, interaction between molecules does not become too small, and the plasticization is prevented, such that the elastic modulus and the heat resistance are further increased.

Incidentally, the substitution degree is an index indicating a degree of acylation of a cellulose derivative. Specifically, the substitution degree means an intramolecular average of the number of substitutions in which three hydroxyl groups included in a D-glucopyranose unit of the cellulose derivative are substituted with an acyl group.

Synthesis Method

The specific cellulose derivative used in the exemplary embodiment, that is, the cellulose derivative of which a weight average molecular weight is 10,000 or greater and less than 75,000, and in which at least one hydroxyl group is substituted with an acyl group having 1 to 6 carbon atoms is synthesized by the following methods, but the synthesis method is not particularly limited.

Adjustment of Molecular Weight of Cellulose

First, cellulose before acylation, that is, cellulose of which a hydroxyl group is not substituted with an acyl group, is prepared and the molecular weight thereof is adjusted.

As the cellulose before acylation, cellulose prepared arbitrarily may be used or commercially available cellulose may be used. Incidentally, the cellulose is usually a resin derived from plants, and the weight average molecular weight thereof is generally higher than that of the specific cellulose derivative according to the exemplary embodiment. Therefore, the adjustment of the molecular weight of the cellulose generally includes a step for decreasing the molecular weight.

For example, the weight average molecular weight of the commercially available cellulose is generally in the range of 150,000 to 500,000.

As the commercially available cellulose before acylation, for example, KC Flock (W50, W100, W200, W300G, W400G, W-100F, W60MG, W-50GK, and W-100GK), NDPT, NDPS, LNDP, and NSPP-HR manufactured by Nippon Paper Industries Co., Ltd. are included.

A method of adjusting a molecular weight of the cellulose before acylation is not particularly limited, but for example, there is a method of decreasing the molecular weight by stirring the cellulose in liquid.

By adjusting the speed and the time for the stirring of the cellulose, the molecular weight of the cellulose may be adjusted to a required value. In addition, though not particularly limited, the stirring speed when the cellulose is stirred is preferably in the range of 50 rpm to 3,000 rpm, and more preferably in the range of 100 rpm to 1,000 rpm. In addition, the stirring time is preferably in the range of 2 hours to 48 hours, and more preferably in the range of 5 hours to 24 hours.

In addition, as the liquid used when the cellulose is stirred, an aqueous solution of hydrochloric acid, an aqueous solution of formic acid, an aqueous solution of acetic acid, an aqueous solution of nitric acid, and an aqueous solution of sulfuric acid are exemplified.

Preparation of Cellulose Derivative

The cellulose of which the molecular weight is adjusted by the methods described above is acylated with an acyl group having 1 to 6 carbon atoms by a well-known method, to thereby obtain a cellulose derivative.

For example, for the case where at least one hydroxyl group included in the cellulose is substituted with an acetyl group, a method of esterifying the cellulose by using the mixture of acetic acid, acetic anhydride, and sulfuric acid is exemplified. In addition, for the case where at least one hydroxyl group included in the cellulose is substituted with a propionyl group, a method of performing esterification by using propionic anhydride in substitution for the acetic anhydride of the mixture is exemplified, for the case where at least one hydroxyl group included in the cellulose is substituted with a butanoyl group, a method of performing esterification by using butyric anhydride in substitution for the acetic anhydride of the mixture is exemplified, and for the case where at least one the hydroxyl group included in the cellulose is substituted with a hexanoyl group, a method of performing esterification by using hexanoic anhydride in substitution for the acetic anhydride of the mixture is exemplified.

After acylation, in order to adjust the substitution degree, a deacylation step may be further performed. In addition, after the acylation step or the deacylation step, a step of further refining the cellulose may be preformed.

Ratio of Cellulose Derivative Occupied in Resin Composition

The ratio occupied by the cellulose derivative with respect to the total amount of the resin composition according to the exemplary embodiment is preferably 70% by weight or more, and more preferably 80% by weight or more. If the ratio is 70% by weight or greater, an elastic modulus is increased, and also heat resistance becomes higher.

Plasticizer

The resin composition according to the exemplary embodiment may further contain a plasticizer.

In addition, the content of the plasticizer is such an amount that the ratio of the cellulose derivative occupied in the total amount of the resin composition becomes the range described above. More specifically, the ratio of the plasticizer with respect to the total amount of the resin composition is preferably 15% by weight or lower, more preferably 10% by weight or lower, and still more preferably 5% by weight or lower. If the ratio of the plasticizer is in the range described above, an elastic modulus becomes higher, and thus heat resistance becomes higher as well. In addition, bleeding of the plasticizer is prevented.

For example, as the plasticizer, an adipic acid ester-containing compound, a polyether ester compound, a sebacic acid ester compound, a glycol ester compound, an acetic acid ester, a dibasic acid ester compound, a phosphoric acid ester compound, a phthalic acid ester compound, camphor, citric acid ester, stearic acid ester, metallic soap, polyol, polyalkylene oxide, and the like are exemplified.

Among these, an adipic acid ester-containing compound, and a polyether ester compound are preferable, and an adipic acid ester-containing compound is more preferable.

Adipic Acid Ester-Containing Compound

An adipic acid ester-containing compound (compound containing adipic acid ester) refers to a compound of individual adipic acid esters, and a mixture of adipic acid ester and components other than adipic acid ester (compound different from adipic acid ester). However, the adipic acid ester-containing compound may preferably contain the adipic acid ester by 50% by weight or more with respect to the total of adipic acid ester and other components.

As the adipic acid ester, for example, adipic acid diester, and adipic acid polyester are exemplified. Specifically, adipic acid diester represented by the formula (2-1) and adipic acid polyester represented by the formula (2-2) are exemplified.

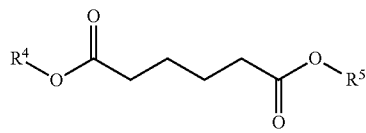

(2-1)

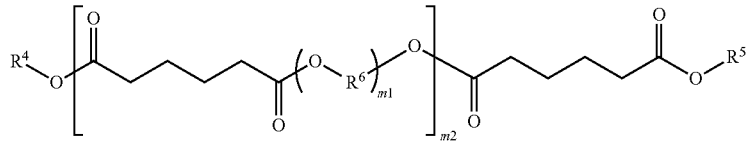

(2-2)

In the formulae (2-1) and (2-2), $R^4$ and $R^5$ each independently represents an alkyl group, or a polyoxyalkyl group $[-(C_xH_{2x}-O)_y-R^{41}]$ (provided that $R^{41}$ represents an alkyl group, x represents an integer in the range of 1 to 10, and y represents an integer in the range of 1 to 10.).

$R^6$ represents an alkylene group.

m1 represents an integer in the range of 1 to 20.

m2 represents an integer in the range of 1 to 10.

In the formulae (2-1) and (2-2), the alkyl groups represented by $R^4$ and $R^5$ are preferably alkyl groups having 1 to 6 carbon atoms, and more preferably alkyl groups having 1 to 4 carbon atoms. The alkyl groups represented by $R^4$ and $R^5$ may have any one of a linear shape, a branched shape, or a cyclic shape, but preferably a linear shape and a branched shape.

In the formulae (2-1) and (2-2), in the polyoxyalkyl group represented by $R^4$ and $R^5$ $[-(C_xH_{2x}-O)_y-R^{41}]$, the alkyl group represented by $R^{41}$ is preferably an alkyl group having 1 to 6 carbon atoms, and more preferably an alkyl group having 1 to 4 carbon atoms. The alkyl group represented by $R^{41}$ may have any one of a linear shape, a branched shape, or a cyclic shape, but preferably a linear shape and a branched shape.

In the formula (2-2), the alkylene group represented by $R^6$ is preferably an alkylene group having 1 to 6 carbon atoms, and more preferably an alkylene group having 1 to 4 carbon atoms. The alkylene group represented by $R^6$ may have any one of a linear shape, a branched shape, or a cyclic shape, but preferably a linear shape and a branched shape.

In the formulae (2-1) and (2-2), the group represented by each of $R^4$ to $R^6$ may be substituted with a substituent. As the substituent, an alkyl group, an aryl group, and a hydroxyl group are exemplified.

The molecular weight of the adipic acid ester (or weight average molecular weight) is preferably in the range of 200 to 5,000, and more preferably in the range of 300 to 2,000. The weight average molecular weight is a value measured according to the method of measuring the weight average molecular weight of the cellulose derivative described above.

Specific examples of the adipic acid ester-containing compound are described below, but the invention is not limited thereto.

|  | Name of Material | Name of Product | Manufacturer |
|---|---|---|---|
| ADP1 | Adipic acid diester | Daifatty 101 | Daihachi Chemical Industry Co., Ltd. |
| ADP2 | Adipic acid diester | Adeka Cizer RS-107 | ADEKA Corporation |
| ADP3 | Adipic acid polyester | Polycizer W-230-H | DIC Corporation |

Polyether Ester Compound

As the polyether ester compound, or example, a polyether ester compound represented by the formula (2) is exemplified.

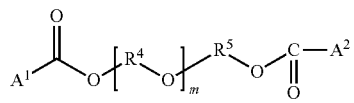

(2)

In the formula (2), $R^4$ and $R^5$ each independently represents an alkylene group having 2 to 10 carbon atoms. $A^1$ and $A^2$ each independently represents an alkyl group having 1 to 6 carbon atoms, an aryl group having 6 to 12 carbon atoms, or an aralkyl group having 7 to 18 carbon atoms. m represents an integer of 1 or greater.

In the formula (2), as the alkylene group represented by $R^4$, an alkylene group having 3 to 10 carbon atoms is preferable, and an alkylene group having 3 to 6 carbon atoms is more preferable. The alkylene group represented by $R^4$ may have any one of a linear shape, a branched shape, or a cyclic shape, but preferably a linear shape.

If the number of carbons of the alkylene group represented by $R^4$ is set to be 3 or greater, the decrease of the fluidity of the resin composition is prevented, and thermoplasticity is easily exhibited. If the number of carbons of the alkylene group represented by $R^4$ is 10 or lower, or the alkylene group represented by $R^4$ has a linear shape, the affinity to the cellulose derivative is easily enhanced. Therefore, if the alkylene group represented by $R^4$ has a linear shape, and the number of carbons is in the range described above, moldability of the resin composition is enhanced.

In this point of view, particularly, the alkylene group represented by $R^4$ is preferably a n-hexylene group (—$(CH_2)_6$—). That is, the polyether ester compound is preferably a compound where $R^4$ represents a n-hexylene group (—$(CH_2)_6$—).

In the formula (2), as the alkylene group represented by $R^5$, an alkylene group having 3 to 10 carbon atoms is preferable, and an alkylene group having 3 to 6 carbon atoms is more preferable. The alkylene group represented by $R^5$ may have any one of a linear shape, a branched shape, or a cyclic shape, but preferably a linear shape.

If the number of carbons of the alkylene group represented by $R^5$ is 3 or greater, the decrease of the fluidity of the resin composition is prevented, and the thermoplasticity is easily exhibited. If the number of carbons of the alkylene group represented by $R^5$ is 10 or lower, or if the alkylene group represented by $R^5$ has a linear shape, the affinity to the cellulose derivative is easily enhanced. Therefore, if the alkylene group represented by $R^5$ has a linear shape, and the number of carbons is in the range described above, moldability of the resin composition is enhanced.

In this point of view, particularly, the alkylene group represented by $R^5$ is preferably a n-butylene group (—$(CH_2)_4$—). That is, the polyether ester compound is preferably a compound where $R^5$ represents a n-butylene group (—$(CH_2)_4$—).

In the formula (2), the alkyl groups represented by $A^1$ and $A^2$ are alkyl groups having 1 to 6 carbon atoms, and alkyl groups having 2 to 4 carbon atoms are more preferable. The alkyl groups represented by $A^1$ and $A^2$ may have any one of a linear shape, a branched shape, or a cyclic shape, but preferably a branched shape.

The aryl groups represented by $A^1$ and $A^2$ are aryl groups having 6 to 12 carbon atoms, and as examples thereof, an unsubstituted aryl group such as a phenyl group and a naphthyl group or a substituted phenyl group such as a t-butylphenyl group and a hydroxyphenyl group are exemplified.

The aralkyl group represented by $A^1$ and $A^2$ is a group represented by —$R^A$-Ph. $R^A$ represents a linear-shaped or branched alkylene group having 1 to 6 carbon atoms (preferably, having 2 to 4 carbon atoms). Ph represents an unsubstituted phenyl group or a substituted phenyl group which is substituted with the linear-shaped or branched alkyl group having 1 to 6 carbon atoms (preferably, having 2 to 6 carbon atoms). As the aralkyl group, specifically, for example, an unsubstituted aralkyl group such as a benzil group, a phenylmethyl group (phenethyl group), a phenylpropyl group, and a phenylbutyl group, and a substituted aralkyl group such as a methylbenzil group, a dimethylbenzil group, and a methylphenethyl group are exemplified.

At least one of $A^1$ and $A^2$ preferably represents an aryl group or an aralkyl group. That is, the polyether ester compound is preferably a compound where at least one of $A^1$ and $A^2$ represents an aryl group (preferably, phenyl group) or an aralkyl group, and preferably a compound where both of $A^1$ and $A^2$ represent an aryl group (preferably, phenyl group) or an aralkyl group.

Subsequently, characteristics of the polyether ester compound are described.

The weight average molecular weight (Mw) of the polyether ester compound is preferably in the range of 450 to 650, and more preferably in the range of 500 to 600.

If the weight average molecular weight (Mw) is 450 or greater, bleeding (phenomenon of deposition) becomes difficult. If the weight average molecular weight (Mw) is 650 or lower, the affinity to the cellulose derivative is easily enhanced. Therefore, if the weight average molecular weight (Mw) is in the range described above, moldability of the resin composition is enhanced.

In addition, the weight average molecular weight (Mw) of the polyether ester compound is a value measured by gel permeation chromatography (GPC). Specifically, the measurement of the molecular weight by GPC is performed by using HPLC1100 manufactured by Tosoh corporation as a measurement apparatus, and TSKgel GMHHR-M+TSKgel GMHHR-M (7.8 mm I.D. 30 cm) which is a column manufactured by Tosoh Corporation, with a chloroform solvent. Also, the weight average molecular weight is calculated by using a molecular weight calibration curve obtained by a monodispersed polystyrene standard sample from the measurement result.

The viscosity of the polyether ester compound at 25° C. is preferably in the range of 35 mPa·s to 50 mPa·s, and more preferably in the range of 40 mPa·s to 45 mPa·s.

If the viscosity is 35 mPa·s or greater, the dispersibility to the cellulose derivative is easily enhanced. If the viscosity is 50 mPa·s or lower, anisotropy of the dispersion of the polyether ester compound hardly appears. Therefore, if the viscosity is in the range described above, the moldability of the resin composition is enhanced.

In addition, the viscosity is a value measured by an E-type viscosmeter.

A solubility parameter (SP value) of the polyether ester compound is preferably in the range of 9.5 to 9.9, and more preferably in the range of 9.6 to 9.8.

If the solubility parameter (SP value) is in the range of 9.5 to 9.9, dispersibility to the cellulose derivative is easily enhanced.

The solubility parameter (SP value) is a value calculated by a Fedor method, and specifically, the solubility parameter (SP value) is, for example, calculated by the following equation in conformity with the description in Polym. Eng. Sci., vol. 14, p. 147 (1974).

$$\text{SP value} = \sqrt{(Ev/v)} = \sqrt{(\Sigma \Delta ei / \Sigma \Delta vi)} \qquad \text{Equation:}$$

(In the equation, Ev: evaporation energy (cal/mol), v: molar volume (cm$^3$/mol), $\Delta ei$: evaporation energy of each atom or atom group, and $\Delta vi$: molar volume of each atom or atom group)

In addition, the solubility parameter (SP value) employs (cal/cm$^3$)$^{1/2}$ as a unit, but the unit is omitted in conformity with practice, and is described in a dimensionless manner.

Hereinafter, specific examples of the polyether ester compound are described, but the invention is not limited thereto.

drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride, and the like) are exemplified. The content of the respective components is in the range of 0% by weight to 5% by weight with respect to the total amount of the resin composition. Here, the expression "0% by weight" means not including other components.

The resin composition according to the exemplary embodiment may contain other resins in addition to the resin described above. However, the other resins are included in amounts with which the ratio of the cellulose derivative occupied in the total amount of the resin composition becomes in the range described above.

As the other resins, for example, the thermoplastic resins which are well-known in the art are included. Specifically, polycarbonate resin; polypropylene resin; polyester resin; a polyolefin resin; polyester carbonate resin; a polyphenylene ether resin; polyphenylene sulfide resin; a polysulfone resin; polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyether nitrile resin; a liquid crystal resin; a polybenzimidazole resin; polyparabanic acid resin; a vinyl-based polymer or a vinyl-based copolymer resin obtained by polymerizing or copolymerizing one or more vinyl monomers selected from the group consisting of an aromatic alkenyl compound, a methacrylic acid ester, acrylic acid ester, and a vinyl cyanide compound; a diene-aromatic alkenyl compound copolymer resin; a vinyl cyanide-diene-aromatic alkenyl compound copolymer resin; an aromatic alkenyl compound-diene-vinyl cyanide-N-phenylmaleimide copolymer resin; a vinyl cyanide-(ethylene-diene-propylene (EPDM))-aromatic alkenyl compound copolymer resin; a vinyl chloride resin; and a chlorinated vinyl chloride resin are exemplified. These resins may be used singly, or two or more types thereof may be used in combination.

| | $R^4$ | $R^5$ | $A^1$ | $A^2$ | Mw | Viscosity (25° C.) | APHA | SP value |
|---|---|---|---|---|---|---|---|---|
| PEE1 | —(CH$_2$)$_6$— | —(CH$_2$)$_4$— | Phenyl group | Phenyl group | 550 | 43 | 120 | 9.7 |
| PEE2 | —(CH$_2$)$_2$— | —(CH$_2$)$_4$— | Phenyl group | Phenyl group | 570 | 44 | 115 | 9.4 |
| PEE3 | —(CH$_2$)$_{10}$— | —(CH$_2$)$_4$— | Phenyl group | Phenyl group | 520 | 48 | 110 | 10.0 |
| PEE4 | —(CH$_2$)$_6$— | —(CH$_2$)$_2$— | Phenyl group | Phenyl group | 550 | 43 | 115 | 9.3 |
| PEE5 | —(CH$_2$)$_6$— | —(CH$_2$)$_{10}$— | Phenyl group | Phenyl group | 540 | 45 | 115 | 10.1 |
| PEE6 | —(CH$_2$)$_6$— | —(CH$_2$)$_4$— | t-Butyl group | t-Butyl group | 520 | 44 | 130 | 9.7 |
| PEE7 | —(CH$_2$)$_6$— | —(CH$_2$)$_4$— | Phenyl group | Phenyl group | 460 | 45 | 125 | 9.7 |
| PEE8 | —(CH$_2$)$_6$— | —(CH$_2$)$_4$— | Phenyl group | Phenyl group | 630 | 40 | 120 | 9.7 |
| PEE9 | —(CH$_2$)$_6$— | —(CH$_2$)$_4$— | Phenyl group | Phenyl group | 420 | 43 | 135 | 9.7 |
| PEE10 | —(CH$_2$)$_6$— | —(CH$_2$)$_4$— | Phenyl group | Phenyl group | 670 | 48 | 105 | 9.7 |
| PEE11 | —(CH$_2$)$_6$— | —(CH$_2$)$_4$— | Phenyl group | Phenyl group | 550 | 35 | 130 | 9.7 |
| PEE12 | —(CH$_2$)$_6$— | —(CH$_2$)$_4$— | Phenyl group | Phenyl group | 550 | 49 | 125 | 9.7 |
| PEE13 | —(CH$_2$)$_6$— | —(CH$_2$)$_4$— | Phenyl group | Phenyl group | 550 | 32 | 120 | 9.7 |
| PEE14 | —(CH$_2$)$_6$— | —(CH$_2$)$_4$— | Phenyl group | Phenyl group | 550 | 53 | 105 | 9.7 |
| PEE15 | —(CH$_2$)$_6$— | —(CH$_2$)$_4$— | Phenyl group | Phenyl group | 550 | 43 | 135 | 9.7 |
| PEE16 | —(CH$_2$)$_6$— | —(CH$_2$)$_4$— | Phenyl group | Phenyl group | 550 | 43 | 105 | 9.7 |
| PEE17 | —(CH$_2$)$_6$— | —(CH$_2$)$_4$— | Phenyl group | Phenyl group | 550 | 43 | 150 | 9.7 |
| PEE18 | —(CH$_2$)$_6$— | —(CH$_2$)$_4$— | Phenyl group | Phenyl group | 550 | 43 | 95 | 9.7 |

Other Components

The resin composition according to the exemplary embodiment may contain other components in addition to the components described above, if necessary. As the other components, for example, a flame retardant, a compatibilizer, an antioxidant, a release agent, a light resistant agent, a weather resistant agent, a colorant, pigments, a modifier, a Method of Preparing Resin Composition The resin composition according to the exemplary embodiment is prepared, for example, by melting and kneading the mixture of the cellulose derivative and the components described above. In addition, the resin composition according to the exemplary embodiment is prepared by dissolving the components in a solvent. As a melting and kneading unit, well known units are included, and specifically, for example, a twin screw extruder, a Henschel mixer, a Banbury mixer, a single screw extruder, a multi-screw extruder, and a co-kneader are included.

In addition, the temperature at the time of kneading may be determined according to the melting temperature of the cellulose derivative used, but in view of the thermal decomposition and the fluidity, the temperature in the range of 140° C. to 240° C. is preferable, and the temperature in the range of 160° C. to 200° C. is more preferable.

Resin Molded Article

The resin molded article according to the exemplary embodiment includes the resin composition according to the exemplary embodiment. That is, the resin molded article according to the exemplary embodiment is made of the same composition as the resin composition according to the exemplary embodiment.

Specifically, the resin molded article according to the exemplary embodiment may be obtained by molding the resin composition according to the exemplary embodiment. As the molding method, injection molding, extrusion molding, blow molding, heat press molding, calendaring molding, coating molding, cast molding, dipping molding, vacuum molding, transfer molding and the like may be applied.

As the method of molding the resin molded article according to the exemplary embodiment, since degrees of freedom in shape are high, injection molding is preferable. With respect to injection molding, the resin composition is heated and melted, casted into a mold, and solidified, so as to obtain a molded article. The resin composition may be molded by injection compression molding.

The cylinder temperature of the injection molding is, for example, in the range of 140° C. to 240° C., preferably in the range of 150° C. to 220° C., and more preferably in the range of 160° C. to 200° C. The mold temperature of the injection molding is, for example, in the range of 30° C. to 120° C., and more preferably in the range of 40° C. to 80° C. The injection molding may be performed, for example, by using a commercially available apparatus such as NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., and SE50D manufactured by Toshiba Machine Co., Ltd.

The resin molded article according to the exemplary embodiment may be appropriately used for the purposes of electric and electronic apparatuses, business machines, home appliances, automobile interior materials, engine covers, car bodies, containers, and the like. More specifically, the resin molded article may be used in housings of electric and electronic apparatuses or home appliances; various components of electric and electronic apparatuses or home appliances; interior components of automobiles; storage cases of CD-ROM, DVD, and the like; food containers; drink bottles; food trays; wrapping materials; films; and sheets.

EXAMPLES

Hereinafter, the invention is described in greater detail with reference to examples, but the invention is not limited to the examples. In addition, unless described otherwise, the expression "part" refers to "part by weight".

Preparation of Cellulose 2 kg of cellulose (KC Flock W50 manufactured by Nippon Paper Industries Co., Ltd.) is put to 20 L of an aqueous solution of 0.1 M hydrochloric acid, and stirred at room temperature (25° C.). In stirring time shown in Table 1, cellulose in respective molecular weights is obtained. In addition, EP-1800 (product name, manufactured by Shinto Scientific Co., Ltd.) is used as a stirring apparatus, and the rotation speed at the time of stirring is set to 500 rpm.

The weight average molecular weight is measured with a GPC apparatus (manufactured by Tosoh corporation, HLC-8320GPC, Column: TSKgel α-M), by using a solution of dimethylacetamide/lithium chloride having a volume ratio of 90/10.

TABLE 1

| | Stirring time (hr) | Weight average molecular weight |
|---|---|---|
| Compound 1 | 0.3 | 75,500 |
| Compound 2 | 1 | 57,800 |
| Compound 3 | 2 | 31,000 |
| Compound 4 | 3 | 10,300 |
| Compound 5 | 5 | 9,400 |

Preparation of Cellulose Derivative

Acetylation Step

Pretreatment activation is performed by spraying 1 kg of Compound 1 in Table 1, with 500 g of glacial acetic acid. Thereafter, a mixture of 3.8 kg of glacial acetic acid, 2.4 kg of acetic anhydride, and 80 g of sulfuric acid is added, and esterification of Compound 1 is performed while the mixture is stirred and mixed at a temperature of 40° C. or lower. Esterification is finished when fiber fragments disappear.

Deacetylation Step 2 kg of acetic acid and 1 kg of water are added to the mixture, and stirred for 2 hours at room temperature (25° C.)

Refinement Step

Further, this solution is slowly dripped to a solution obtained by dissolving 20 kg of sodium hydroxide in 40 kg of water while the solution is stirred. The obtained white precipitate is suction-filtered and washed with 60 kg of water, and a cellulose derivative (Compound 6) is obtained.

Cellulose derivatives (Compounds 7 to 10) are obtained in the same manner as described above except for changing Compound 1 to Compounds 2 to 5.

A cellulose derivative (Compound 11) is obtained in the same manner as described above except for using Compound 3 performing a refinement step right after an acetylation step is finished.

Cellulose derivatives (Compounds 12 to 16) are obtained in the same manner as described above except for using Compound 3 changing stirring time in deacetylation steps to 0.5 hours, 1 hour, 3 hours, 5 hours, and 10 hours, respectively.

Cellulose derivatives (Compounds 17 to 19) are obtained in the same manner as described above except for using Compound 3 and changing 2.4 kg of acetic anhydride in an acetylation step respectively to 2 kg of propionic anhydride/0.3 kg of acetic anhydride and 1.8 kg of n-butyric anhydride/6 kg of acetic anhydride and 0.5 kg of n-hexanoic anhydride.

Weight average molecular weights are obtained in the same manner as in Compound 1, and substitution degrees are obtained with $H^1$-NMR measurement (JNM-ECZR manufactured by JEOL Ltd.).

The results are collectively shown in Table 2.

TABLE 2

|  | Weight average molecular weight | Substituent | Substitution degree |
|---|---|---|---|
| Compound 6 | 79,800 | Acetyl | 2.15 |
| Compound 7 | 63,300 | Acetyl | 2.22 |
| Compound 8 | 38,800 | Acetyl | 2.25 |
| Compound 9 | 11,000 | Acetyl | 2.21 |
| Compound 10 | 9,900 | Acetyl | 2.19 |
| Compound 11 | 42,300 | Acetyl | 2.78 |
| Compound 12 | 40,500 | Acetyl | 2.59 |
| Compound 13 | 39,000 | Acetyl | 2.48 |
| Compound 14 | 37,000 | Acetyl | 1.65 |
| Compound 15 | 36,100 | Acetyl | 0.38 |
| Compound 16 | 35,800 | Acetyl | 0.25 |
| Compound 17 | 42,500 | n-propionyl/acetyl | 2.05/0.35 |
| Compound 18 | 44,300 | n-butanoyl/acetyl | 1.88/0.55 |
| Compound 19 | 36,000 | n-hexanoyl | 0.55 |

Cellulose Derivatives C-1 to C-6 obtained in Synthesis Examples 1 to 6 (paragraphs [0107] to [0112]) of Japanese Patent No. 5,470,032 are set to Compounds 20 to 25, respectively.

TABLE 3

|  | Synthesis example of Japanese Patent No. 5,470,032 | Weight average molecular weight | Substituent | Substitution degree* |
|---|---|---|---|---|
| Compound 20 | C-1 | 185,000 | Methyl/propylene oxy acetyl + acetyl | 1.95/1.05 |
| Compound 21 | C-2 | 617,000 | Methyl/propylene oxy acetyl + acetyl | 1.84/1.16 |
| Compound 22 | C-3 | 770,000 | Methyl/propylene oxy acetyl + acetyl | 1.47/1.53 |
| Compound 23 | C-4 | 680,000 | Methyl/propylene oxy acetyl + acetyl | 1.45/1.55 |
| Compound 24 | C-5 | 402,000 | Methyl/propylene oxy propionyl + propionyl | 1.5/1.5 |
| Compound 25 | C-6 | 237,000 | Methyl/propylene oxy acetyl + acetyl | 1.43/1.57 |

*Substitution degree of alkyl/Sum of substitution degree of alkyleneoxyacyl and substitution degree of acyl Preparation of Pellets Kneading is performed with a twin screw kneading apparatus (TEX41SS manufactured by Toshiba Machine Co., Ltd.) at kneading temperatures in mixing ratio compositions shown in Examples 1 to 23 and Comparative Examples 1 to 10 shown in Tables 4 and 5, so as to obtain resin composition pellets.

TABLE 4

|  | Composition ratio | | | Kneading temperature (° C.) |
|---|---|---|---|---|
|  | Cellulose derivatives (parts by weight) | Plasticizer (parts by weight) | | |
| Example 1 | Compound 7 (100) | | | 200 |
| Example 2 | Compound 8 (100) | | | 190 |
| Example 3 | Compound 9 (100) | | | 180 |
| Example 4 | Compound 11 (100) | | | 180 |
| Example 5 | Compound 12 (100) | | | 190 |
| Example 6 | Compound 13 (100) | | | 190 |
| Example 7 | Compound 14 (100) | | | 190 |
| Example 8 | Compound 15 (100) | | | 200 |
| Example 9 | Compound 16 (100) | | | 200 |
| Example 10 | Compound 17 (100) | | | 160 |
| Example 11 | Compound 18 (100) | | | 160 |
| Example 12 | Compound 19 (100) | | | 170 |
| Example 13 | Compound 8 (95) | | Compound 27 (5) | 180 |
| Example 14 | Compound 8 (90) | | Compound 27 (10) | 160 |
| Example 15 | Compound 8 (85) | | Compound 27 (15) | 150 |
| Example 16 | Compound 7 (90) | Compound 26 (10) | | 220 |
| Example 17 | Compound 7 (80) | Compound 26 (20) | | 210 |
| Example 18 | Compound 7 (70) | Compound 26 (30) | | 200 |
| Example 19 | Compound 8 (90) | Compound 26 (10) | | 190 |
| Example 20 | Compound 8 (80) | Compound 26 (20) | | 190 |
| Example 21 | Compound 8 (70) | Compound 26 (30) | | 200 |
| Example 22 | Compound 7 (75) | Compound 26 (20) | Compound 27 (5) | 200 |
| Example 23 | Compound 8 (75) | Compound 26 (20) | Compound 27 (5) | 180 |

TABLE 5

|  | Composition ratio | | Kneading temperature (° C.) |
|---|---|---|---|
|  | Cellulose derivatives ((parts by weight)) | Plasticizer ((parts by weight)) | |
| Comparative Example 1 | Compound 6 (100) | | 200 |
| Comparative Example 2 | Compound 10 (100) | | 170 |
| Comparative Example 3 | Compound 6 (90) | Compound 27 (10) | 180 |
| Comparative Example 4 | Compound 10 (90) | Compound 27 (10) | 160 |
| Comparative Example 5 | Compound 20 (100) | | 200 |
| Comparative Example 6 | Compound 21 (100) | | 205 |
| Comparative Example 7 | Compound 22 (100) | | 200 |
| Comparative Example 8 | Compound 23 (100) | | 200 |

TABLE 5-continued

| | Composition ratio | | Kneading temperature (° C.) |
|---|---|---|---|
| | Cellulose derivatives ((parts by weight)) | Plasticizer ((parts by weight)) | |
| Comparative Example 9 | Compound 24 (100) | | 190 |
| Comparative Example 10 | Compound 25 (100) | | 190 |

In addition, details of Compounds 26 and 27 described in Tables 4 and 5 are described below.

Compound 26: Dimethyl cellulose (L50 manufactured by Daicel Corporation, weight average molecular weight: 170,000)

Compound 27: Adipic acid ester mixture (Daifatty101 manufactured by Daihachi Chemical Industry Co., Ltd.)

Injection Molding

With the obtained pellets, ISO multi-purpose dumbbell test samples (test portion: 100 mm in length, 10 mm in width, and 4 mm in thickness) are manufactured at cylinder temperatures and mold temperatures shown in Tables 6 and 7 using an injection molding machine (PNX40 manufactured by Nissei Plastic Industrial Co., Ltd.).

Bending Elastic Modulus

With respect to the obtained dumbbell test samples, bending elastic modulus are measured in a method in conformity with ISO-178 by using a universal testing device (Autograph AG-Xplus manufactured by Shimadzu Corporation). The results are shown in Tables 6 and 7.

Heat Resistance (Deflection Temperature Under Load)/Heat Resistance Evaluation

Deflection temperatures under load are measured by using the obtained dumbbell test samples and an apparatus for measuring deflection temperature under load (HDT-3 manufactured by Toyo Seiki Seisaku-sho Ltd.) in a method conforming to ISO-75, under the condition of load of 1.8 MPa. The results are shown in Tables 6 and 7.

Test of Thermal Fluidity

Thermal fluidity of pellets is evaluated in the following method. The results are shown in Tables 6 and 7.

Melt volume rates (MVR) are measured under a load of 10 kg, at a temperature of 200° C., in a melt indexer (MI3 manufactured by Toyo Seiki Seisaku-sho Ltd.).

TABLE 6

| | Molding condition | | | Deflection | MVR of |
|---|---|---|---|---|---|
| | Cylinder temperature (° C.) | Mold temperature (° C.) | Bending elastic modulus (MPa) | temperature under load of 1.8 MPa (° C.) | thermal fluidity (cm³/10 min) |
| Example 1 | 200 | 40 | 4,400 | 115 | 10 |
| Example 2 | 190 | 40 | 4,300 | 118 | 12 |
| Example 3 | 180 | 40 | 4,400 | 114 | 14 |
| Example 4 | 180 | 40 | 4,800 | 91 | 14 |
| Example 5 | 190 | 40 | 4,600 | 86 | 12 |
| Example 6 | 190 | 40 | 4,400 | 114 | 12 |
| Example 7 | 190 | 40 | 4,500 | 82 | 12 |
| Example 8 | 200 | 40 | 4,550 | 80 | 10 |
| Example 9 | 200 | 40 | 4,800 | 82 | 10 |
| Example 10 | 160 | 40 | 4,000 | 93 | 18 |
| Example 11 | 160 | 40 | 3,800 | 92 | 18 |
| Example 12 | 170 | 40 | 3,800 | 91 | 16 |
| Example 13 | 180 | 40 | 4,100 | 103 | 14 |
| Example 14 | 160 | 40 | 4,050 | 97 | 18 |
| Example 15 | 150 | 40 | 3,750 | 85 | 20 |
| Example 16 | 220 | 40 | 5,450 | 125 | 8 |
| Example 17 | 210 | 40 | 5,400 | 128 | 9 |
| Example 18 | 200 | 40 | 5,400 | 129 | 10 |
| Example 19 | 190 | 40 | 4,350 | 103 | 12 |
| Example 20 | 190 | 40 | 4,400 | 100 | 12 |
| Example 21 | 200 | 40 | 4,350 | 96 | 10 |
| Example 22 | 200 | 40 | 5,000 | 155 | 10 |
| Example 23 | 180 | 40 | 4,050 | 89 | 14 |

TABLE 7

| | Molding condition | | | Deflection | MVR of |
|---|---|---|---|---|---|
| | Cylinder temperature (° C.) | Mold temperature (° C.) | Bending elastic modulus (MPa) | temperature under load of 1.8 MPa (° C.) | thermal fluidity (cm³/10 min) |
| Comparative Example 1 | 200 | 40 | 3,000 | 83 | 4 |
| Comparative Example 2 | 170 | 40 | 1,750 | 59 | 5 |
| Comparative Example 3 | 180 | 40 | 2,850 | 75 | 20 |
| Comparative Example 4 | 160 | 40 | 1,350 | 53 | 24 |
| Comparative Example 5 | 200 | 40 | 1,550 | 80 | 8 |
| Comparative Example 6 | 205 | 40 | 1,450 | 92 | 6 |
| Comparative Example 7 | 200 | 40 | 1,400 | 106 | 8 |
| Comparative Example 8 | 200 | 40 | 1,300 | 102 | 8 |
| Comparative Example 9 | 190 | 40 | 1,550 | 69 | 10 |
| Comparative Example 10 | 190 | 40 | 1,550 | 99 | 10 |

The resin compositions and the resin molded articles in the examples described above that contain cellulose derivatives of which the weight average molecular weights are in the range of 10,000 or greater and less than 75,000, and in which a portion of a hydroxyl group is substituted with an acyl group having 1 to 6 carbon atoms exhibit not only satisfactory injection moldability but also a high elastic modulus and heat resistance, which are compatible with each other, compared with the comparative examples.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin molded article comprising a resin composition, the resin composition comprising:
   an acetyl cellulose of which a weight average molecular weight is 10,000 or greater and less than 75,000,
   wherein a substitution degree of the acetyl group in the acetyl cellulose is in a range of 1.8 to 2.5.

2. The resin molded article according to claim 1, wherein a weight average molecular weight of the acetyl cellulose is in a range of 20,000 to 50,000.

3. The resin molded article according to claim 1, wherein a substitution degree of the acetyl group in the acetyl cellulose is in a range of 2.0 to 2.5.

4. The resin molded article according to claim 1, wherein a substitution degree of the acetyl group in the acetyl cellulose is in a range of 2.2 to 2.5.

5. The resin molded article according to claim 1, wherein a ratio of the acetyl cellulose occupied in a total amount of the resin composition is 70% by weight or greater.

6. The resin molded article according to claim 1, which is molded by injection molding.

7. An injection-molded article having a bending elastic modulus of 3,750 MPa to 5,450 MPa and including a resin composition comprising acetyl cellulose, wherein:
   the acetyl cellulose has a weight average molecular weight of 10,000 or greater and less than 75,000, and
   a substitution degree of the acetyl group in the acetyl cellulose is in a range of 8 to 2.5.

* * * * *